United States Patent [19]
Van de Graaf et al.

[11] Patent Number: 5,639,287
[45] Date of Patent: Jun. 17, 1997

[54] FILTER SYSTEM FOR FILTERING FLUIDS

[75] Inventors: Peter Van de Graaf, St. Josephstraat; Anton J. J. Horsten, Statenlaan, both of Netherlands

[73] Assignee: Minnesota Mining and Manufacturing Company, St. Paul, Minn.

[21] Appl. No.: 573,565

[22] Filed: Dec. 15, 1995

Related U.S. Application Data

[62] Division of Ser. No. 244,014, May 16, 1994, Pat. No. 5,501,794.

[51] Int. Cl.$^6$ .................................. B01D 50/00
[52] U.S. Cl. .................. 55/385.3; 55/500; 55/501; 55/511; 55/521; 55/DIG. 39
[58] Field of Search ................. 210/494.3, 493.1, 210/493.2, 493.3, 493.5; 55/497, 500, 511, 521, DIG. 39, 499, 501, 385.3

[56] References Cited

U.S. PATENT DOCUMENTS

| | | | |
|---|---|---|---|
| 3,243,943 | 4/1966 | Getzin | 55/499 |
| 4,042,358 | 8/1977 | Frohmader | 55/497 |
| 4,135,900 | 1/1979 | Westlin et al. | 55/499 |
| 4,142,551 | 3/1979 | Wilms | 137/615 |
| 4,227,953 | 10/1980 | Wasielewski et al. | 156/227 |
| 4,323,374 | 4/1982 | Shinagawa et al. | 55/DIG. 39 |
| 4,518,402 | 5/1985 | Dargel | 55/501 |
| 4,963,171 | 10/1990 | Osendorf | 55/355 |

FOREIGN PATENT DOCUMENTS

| | | |
|---|---|---|
| 1289456 | 2/1962 | France . |
| 2138412 | 3/1973 | Germany . |
| 2557444 | 10/1976 | Germany . |
| 3439255 | 10/1984 | Germany . |
| 3529579 | 2/1987 | Germany . |
| 3534318 | 4/1987 | Germany . |
| 3716243 | 11/1988 | Germany . |
| 3815907 | 12/1988 | Germany . |
| 3903730 | 9/1990 | Germany . |
| 5245325 | 9/1993 | Japan ............. 55/DIG. 39 |
| 2010120 | 6/1979 | United Kingdom . |

*Primary Examiner*—W. L. Walker
*Attorney, Agent, or Firm*—Gary L. Griswold; Walter N. Kirn; William J. Bond

[57] ABSTRACT

The filter system comprises a filter element (10) arranged in wave- or zig-zag-shaped folds and having flat filter element portions (12) and intermediate bending lines (14). The longitudinal edges of the filter element (10) are connected to tensioning bands (20). When the filter element (10) is stretched, these tensioning bands (20) are tensioned and in their tensioned condition fulfill a holding function for holding the filter element portions (12) in the stretched condition of the filter element (10). Thus, no spacers are required on the filter frame (22) for maintaining the stability of shape of the filter element (10).

5 Claims, 5 Drawing Sheets

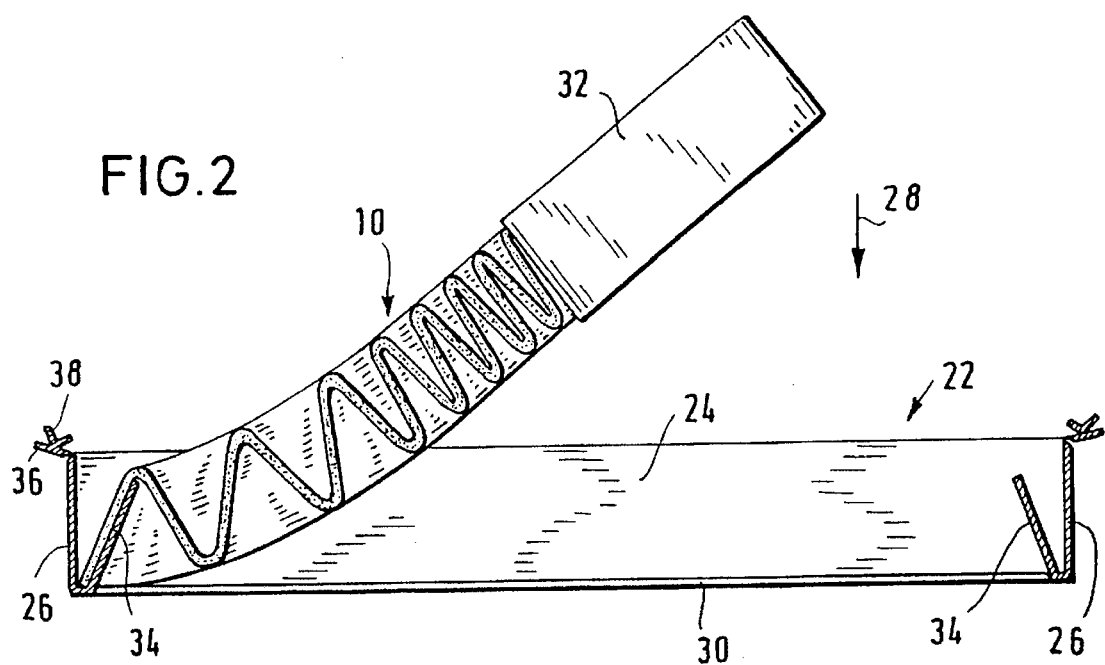
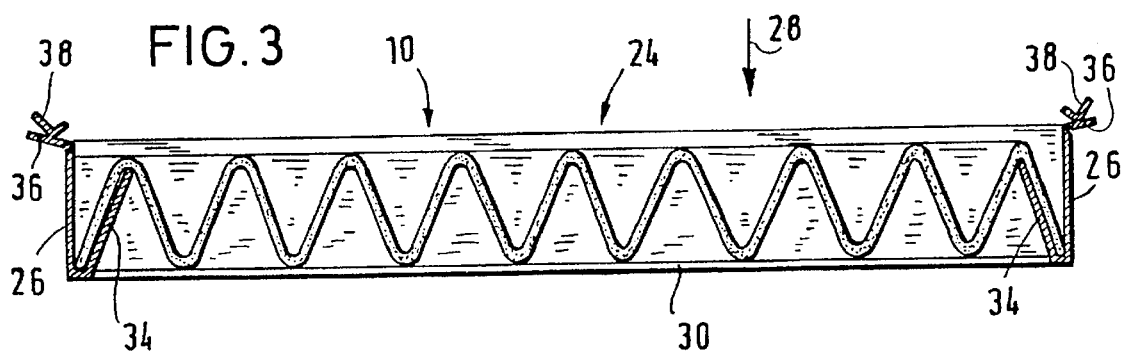
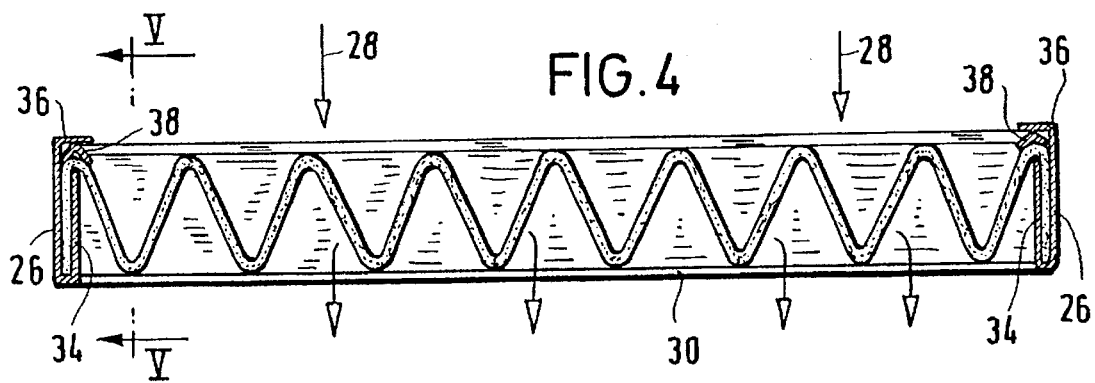

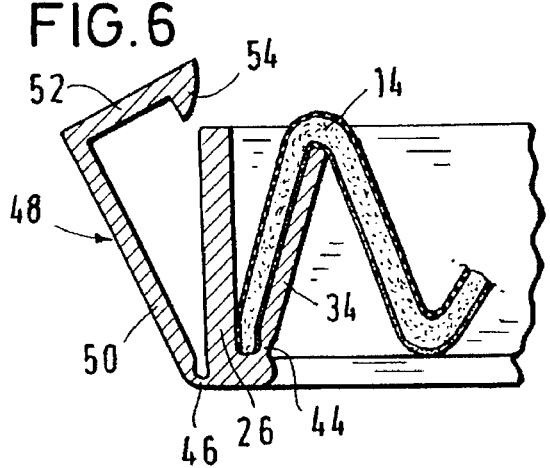
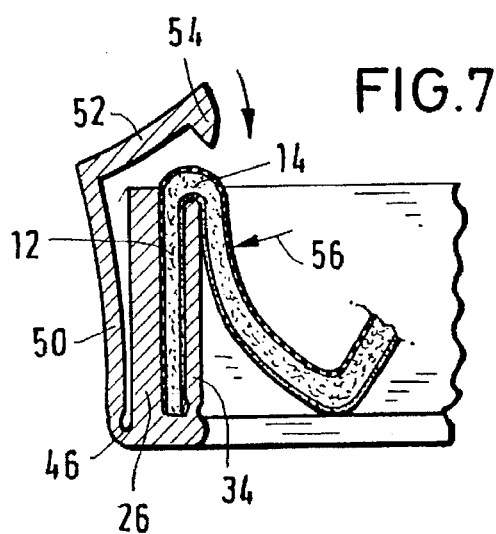
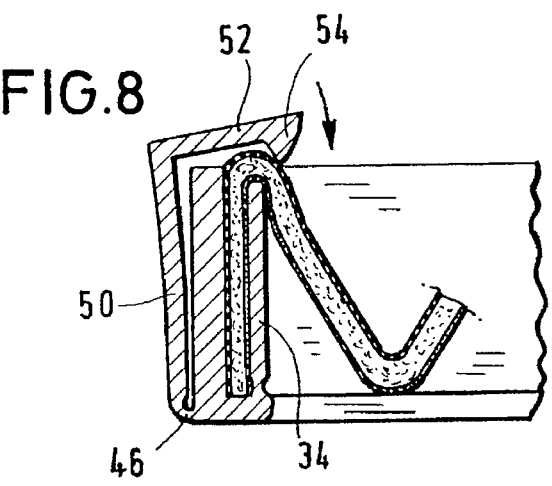
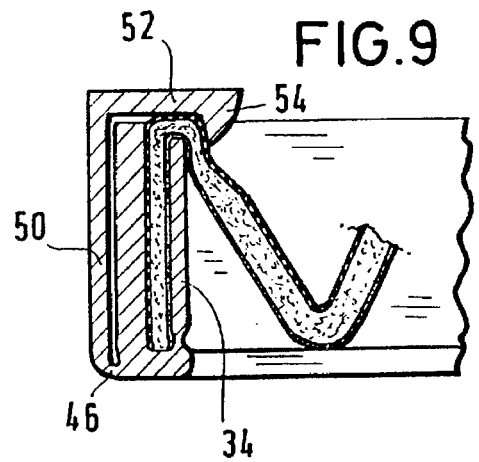
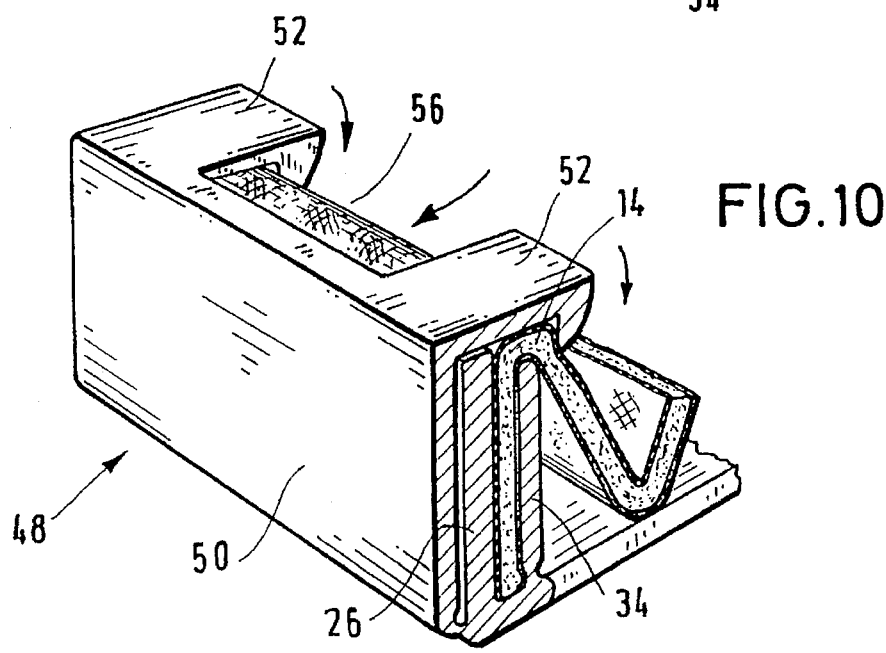

FILTER SYSTEM FOR FILTERING FLUIDS

This is a division of application Ser. No. 08/244,014 filed May 16, 1994, now U.S. Pat. No. 5,501,794.

BACKGROUND AND FIELD OF THE INVENTION

The invention is directed to a filter system for filtering fluids, particularly gases, particularly for filtering air streaming into the passenger cabin of a vehicle, comprising a filter element folded in a wave-shaped or zig-zag-shaped manner having bending lines and substantially plane filter element folding portions arranged therebetween, the filter element being adapted to be stretched in the direction of its successive folding portions and to be compressed in the opposite direction.

A pleated paper filter is known from French Patent No. 1,289,456, provided with longitudinal paper glued to the edge of the filter. The paper filter is maintained in the pleated zig-zag condition by a rigid peripheral framework in conjunction with longitudinal and transverse support wires. The transverse wires are attached to two parallel longitudinal-wires side edges of the filter. The transverse support wires engage the filter at the bending lines of each pleat fold maintaining the pleat structure and spacing.

Filter systems for filtering air streaming into the passenger cabin of a vehicle are known in a wide range of versions. Examples of such known filter devices are described in German Laid-open Application Nos. 25 57 444, 35 29 579, 35 34 318, 37 16 243 and 38 15 907, as well as in German Patent Specifications 21 38 412 and 34 39 255 and, finally, in German Utility Model 80 01 798. A common feature of all these filter systems resides in that the filter element is fixedly mounted in a filter frame so that exchange of the filter element is not possible without exchanging the filter frame along with it.

In known filter systems, the filter element is arranged in wave- or zig-zag-shaped folds for enlarging the filtering area. Since the filtering materials (for instance, paper or non-woven materials) have hardly any inherent stability of shape, there is either added an air-permeable reticular support structure to the filter element, or there are provided spacers for keeping the substantially plane folding portions of the filter element between successive bending lines of the filter element at mutual distances and thus maintaining said filter element folding portions in their V-shaped orientation relative to each other. The provision of spacers complicates the construction of the filter system.

The filter system known from EP 0 170 643 comprises a filter element adapted for insertion into a filter frame. The filter element is accommodated in the filter frame in a manner allowing exchange of the filter element. For providing stability of shape of the zig-zag-shaped filter element, also this known filter system includes special mutually engaging teeth on the two-part filter frame. By such teeth or spacers, not only the construction of the filter system but also the process of inserting a new filter element becomes more complicated.

It is the object of the invention to provide a filter system wherein the filter element is automatically given stability of shape with increased stretching thereof.

For solving the above object, the invention provides a filter system of the initially mentioned type wherein the filter element is provided with two tensioning members for limiting the stretching of the filter element and for fixing the filter element folding portions in the stretched condition of the filter element, and wherein the tensioning members at the two side edges of the filter element extending in stretching direction are tightly connected to the filter element.

In the filter system of the invention, the filter element is provided with a respective tensioning member on each of its two edges extending in stretching direction. This tensioning member is resistant to tensile forces and will not stretch to any noteworthy extent when subjected to tension; for instance, the tensioning member can be a flexible tensioning band resistant to tensile forces and being hardly stretchable. Typically, the tensioning member will be an inelastic, high modulus, flexible web. This tensioning band or tensioning member is fixedly connected to the edges of the filter element being wave-shaped in side view. The flexibility of the tensioning members allows compression of the filter element in a direction opposite to their stretching direction; then, those portions of the tensioning members which are not connected to the filter element will become folded or will collapse in wave shapes.

The tensioning members at the edges of the filter element limit the extent of the stretching of the filter element. When stretched up to their limit, the high modulus tensioning members are subjected to tension and are tightly strung. Because of the firm connection of the edges of the filter element to the tensioning members, no movement is possible for the individual filter element folding portions oriented in V-shaped manner to each other; this is because the filter element folding portions are held in position at their lateral ends by the tightened and rigid tensioning members. In the filter element of the filter system of the invention, additional spacers, protruding into the V-shaped intermediate spaces between adjacent filter element folding portions, are not required so that the construction of the filter frame receiving the filter element can be simplified, if desired.

Preferably, the filter element comprises a reticular support structure holding a filter material layer, preferably an electro filter material layer. The reticule support structure, being comparatively bending-resistant, is folded corresponding to the folding portions of the filter element and, on its lateral edges extending in the stretching direction, is connected to the tensioning members, e.g., by gluing or welding. The filter material layer does not necessarily need to be connected to the tensioning members, but preferably is connected thereto. The reticular support structure is many times more resistant to tearing than the filter material layer.

Preferably, the tensioning members are provided as tensioning bands whose width is equal to or substantially equal to the horizontal distance between two adjacent bending lines (folding or bending lines). Accordingly, the bending lines of the filter element on the upstream flow direction extend at the one longitudinal edge of the tensioning band while the downstream bending lines of the filter element are arranged at the opposite parallel side edge of the tensioning band.

For assembly (connection) of the tensioning members with the filter element, the filter element is first stretched to the desired extent so that adjacent filter element folding portions extend in a specific angle to each other. In this condition of the filter element, the tensioning bands or tensioning members are glued, attached by ultrasonic welding, or fastened in some other suitable manner on both longitudinal sides. During fastening, the tensioning bands or tensioning members are in the fully stretched condition. When later stretched, the filter element will not extend beyond the point where the filter element was fastened to the tensioning members. Thus, when the filter element has been stretched to the limit, adjacent filter element folding portions extend at an angle or in V-shaped orientation to each other.

Preferably, the substantially non-stretchable or high modulus tensioning members consist of a fibrous web material resistant to tensile forces, particularly a strengthened non-woven material of thermoplastic fibers. Upon insertion of the filter element in the filter frame, the tensioning members or tensioning bands abut two opposite inner faces of the filter frame. A fibrous or non-woven material inevitably has the effect that individual fiber protrude out of the surface of the tensioning band. These fibers abut on the inner faces of the filter frame and in this region exert a filtering function on any flow of the medium in this region.

By strengthening the non-woven material through treating and processing methods known for that purpose, such as heat treatment and/or calendering, it is also possible to utilize fiber materials for the tensioning members, which is advantageous because of the above mentioned additional filtering effect of the projecting fiber ends. Particularly, the tensioning members consists of thermoplastic (staple) fibers being multiply thermally bonded and randomly arranged.

The filter frame for insertion of the filter element therein is provided with a stretching means for stretching the filter element and for holding the filter element in the stretched condition thereof. This stretching means may be arranged on one filter frame portion only; however, it is also possible that each of the two ends in the longitudinal direction of the filter element has a stretching means assigned thereto. By means of said one or plurality of tensioning means, the filter element is stretched within the filter frame to such a degree that the tensioning members are subjected to a-pulling force and are tightened. The stretching means can engage either the ends of the tensioning members or the outer filter element folding portions. Advantageously, the stretching means is connected to a locking element by which the part of the stretching means providing the stretching force is locked in the stretching position for stretching the filter element.

In an advantageous embodiment of the stretching means, the filter frame is provided with two holding members for holding the two outermost filter element folding portions in the stretch direction, said outermost filter element folding portions being adapted to be mounted onto said holding members from above while a complete, or at least partial, stretching of the filter element is effected. The holding members, being e.g., plate-like elements, are preferably articulated on two opposite portions of the filter frame, and then preferably on the rear inner edges of the respective filter frame portion when seen in the flow direction. For stretching, at least one of the holding members can be pivoted on a pivot point in a direction away from the other one and toward the filter frame. For securing the movable holding member against return movement due to mechanical stress of the stretched filter element, there is provided a locking hook for locking the holding member in its pivoted position against the inner face of the filter frame. This locking hook can also be provided for engagement above the filter element at one or both of the outer bending lines. Since the holding member engages the filter element folding portion from below and extends up to the bending line, the holding member will be held by the locking hook gripping the filter element.

The filter system of the invention is relatively inexpensive in manufacture. Manufacturing costs are decreased particularly because the filter element itself need only have a comparatively low stability of shape because the stability of shape, i.e., maintenance of the filter element folding portions in their angular positions to each other, is effected by the tensioning members. Filter elements with reticular support structures or the like, can be provided allowing the filter element to be less strong and stable without the danger of ballooning or collapsing of adjacent filter element folding portions in their V-shaped orientation.

In an advantageous embodiment of the invention, the filter element is provided with a reticular support structure having connected thereto an electret filter layer of a non-woven material, the layer of non-woven material preferably being arranged behind the reticular support structure when viewed in the flow direction, and the electret filter layer is freely expandable to the side facing away from the reticular support structure and the flow direction. Both the reticular support and the electret filter would be fastened to the tensioning means. The non-woven material of the electret layer is connected to the reticular support structure by gluing, welding or in a mechanical manner and therefore is (directly or indirectly) held on the reticular support structure. Thus, the medium flow passing through the filter element first penetrates the permeable reticular support structure and then the non-woven material of the electret filter layer while widening this loose non-woven material layer; the resultant enlargement of volume leads to an increased storage capacity of the filter element and thus longer service life. Particularly, due to the enlarged distance of the individual fibers of the electret filter layer, more space is available around the fibers for the binding of particles through the electrical charge of the individual fibers. Since the electret filter layer is covered by the reticular support structure on the flow receiving side of the filter element, protruding fibers of the non-woven material are pressed down so that only very few of these fibers will extend through the reticular support structure. Because of the reduced number of fibers of the non-woven material projecting into the V-shaped intermediate spaces, the turbulences generated in these V-shaped recesses will be weaker. In other words, for having to tolerate the same turbulences as in a filter element having the non-woven material arranged before the reticular support structure as seen in the flow direction, the wave shape of the filter element can be made denser. This means that the number of folds, i.e, the number of filter element folding portions per unit of length, can be increased. Thus, the folding portions can extend at still more acute angles to each other so that the filter area is enlarged. With the same air resistance and an enlarged filter surface, there is finally obtained an improvement of the air resistance by the arrangement of the non-woven material layer behind the reticular support structure.

Accordingly, the increased storage capacity in the filter element in the filter system of the invention is realized, on the one hand, in that the filter element layer can freely expand in the fluid flow and thus have its volume enlarged; and on the other hand, contributing to an enlarged storage capacity in that a constant air resistance allows an increase of the filtering area. Also, the arrangement of only one electret filter layer behind the reticular support structure improves the flow characteristics of the filter element.

In a further embodiment of the invention, the layer of nonwoven material on the side or surface thereof facing away from the reticular support structure is provided with a cover layer for keeping the non-woven material together. As mentioned above, the non-woven material layer can widen during the passage of the medium through the filter element. To keep the non-woven material of the filter material layer from "flying off", the fiber material is bound or held together also on its free side facing away from the reticular support structure by the cover layer.

This cover layer does not restrict the expansion of the non-woven material; instead, when the filter element has fluid passing therethrough, the cover layer will move away from the reticular support structure to the extent to which the non-woven material is expanded. The cover layer merely fulfills the function of keeping the non-woven material together for preventing that individual fibers become detached from the electret filter layer or are torn out of it while the fluid flow is passing through the filter element.

Preferably, the cover layer consists of a strengthened non-woven material. The strengthening of the non-woven material can be performed by the usual treating and processing techniques known for that purpose. Particularly, the cover layer consists of thermoplastic (staple) fibers being multiply thermally bonded and randomly arranged. The cover layer has greater strength (against tearing) than the electret filter layer whose non-woven material even if strengthened in a certain manner, e.g., by being needle tacked - are connected in a relatively loose manner as compared to the cover layer. However, this strengthened nonwoven material has no inherent stability, i.e., the zigzag-shaped folds of the filter element are maintained by the correspondingly folded or formed reticular support structure and tensioning members.

Advantageously, both the reticular support structure and the non-woven material (of the filter material layer and, if provided, the cover layer) are the same thermoplastic material, preferably polypropylene. It is preferred that all of the components of the filter element and of the overall filter system consist of the same thermoplastic material, which is advantageous for recycling purposes. Polypropylene has been found to be particularly useful for the filter system.

The filter system of the invention is preferably placed into the to-be-filtered fluid flow in such a manner that the reticular support structure is the first layer of the filter element to come into contact with the fluid. The reticular support structure is then followed by the electret filter layer and—if provided—the cover layer. For maintaining the fluid flow, there is provided a suitable means, e.g., a blower or the like, for blowing the air through the filter element. The term "means" has a very wide meaning in the context of the invention; it is meant to comprises all devices and circumstances providing for a (fluid) flow passing through the filter element. Ultimately, such a means can also be the vehicle itself because the vehicle, provided with the filter system of the invention, generates an airflow while being driven, with the airflow streaming through the filter element of the filter system.

BRIEF DESCRIPTION OF THE DRAWINGS

Embodiments of the invention will be explained in greater detail hereunder with reference to the drawings.

FIG. 2 is a side view of a filter frame with a partially inserted filter element being taken out of a box in a tightly folded condition.

FIG. 3 shows the wave-shaped arrangement of the filter element in the filter frame.

FIG. 4 is a view of the filter element in its stretched position maintained by the stretching means of the filter frame.

FIGS. 6 to 10 are views of an alternative embodiment of a stretching means for stretching the filter element within the filter frame.

DETAILED DESCRIPTION OF THE INVENTION

Figure 1:
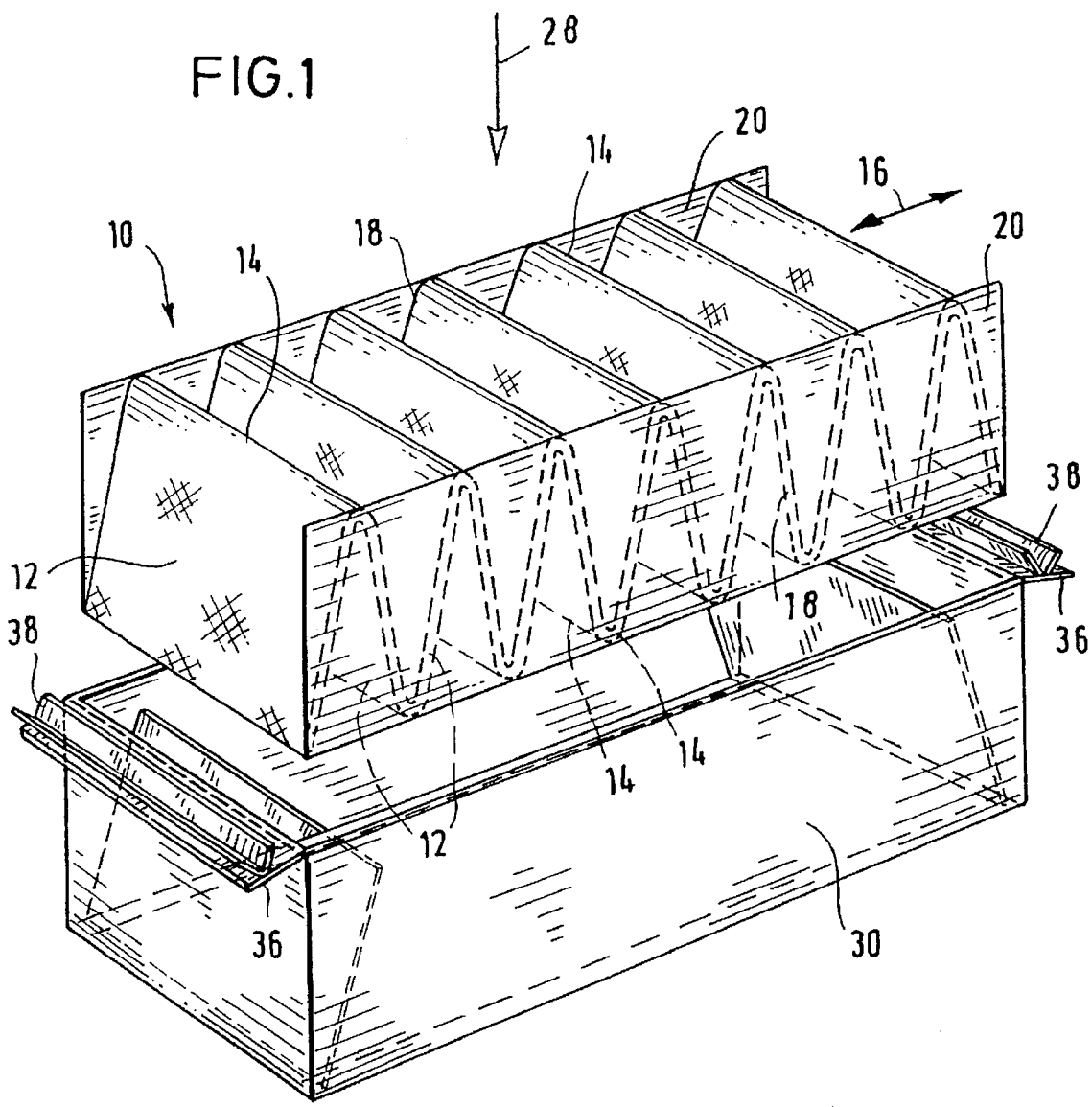
FIG. 1 is a perspective view of the filter element in the stretched condition.

FIG. 1 is a perspective view of the filter element 10 oriented with wave- or zig-zag-shaped folds, comprising substantially linear filter element folding portions 12 arranged in V-shaped pairs, and bending lines 14 connecting the filter element folding portions 12. Because of its wave shape, filter element 10 can be stretched or compressed in the direction of the twin arrow 16 of FIG. 1. The waveshaped lateral edges 18 are glued to non-elastic, flexible tensioning bands 20 which are resistant to stretching (i.e., of a high modulus). On the one hand, these tensioning bands 20 limit the extent to which the filter element 10 is stretched; on the other hand, they serve for stabilizing and maintaining the wave shape of filter element 10 in the condition wherein the filter element is stretched to the limit. In the stretched condition, the tensioning bands 20 are subjected to tension whereby the individual filter element folding portions 12 are practically tightly secured at their side edges, allowing only restricted movement of the filter element folding portions 12. The filter element can be inserted into a filter frame 22 as shown in FIGS. 2 to 4. Filter frame 22 comprises two parallel longitudinal portions,24 extending in longitudinal direction and two parallel transverse portions 26 connecting said portions 24. When viewed in the flow direction (see arrow 28 in FIG. 1), the rear inner edge of filter frame 22 has integrally connected thereto a peripheral flange 30 on which the filter element 10 is supported at its edges.

As already mentioned above, filter element 10 can be compressed in such a manner that the individual filter element folding portions 12 extend parallel to each other and are arranged to the side of each other. In this condition, filter element 10 occupies only a small volume whereby it can be stored with minimum space requirements in a small cardboard box 32 or the like. When box 32 is opened, filter element 10 will emerge therefrom due to its inherent tension in its folded condition; the thus projecting end of filter element 10 is mounted on a holding plate 34. Holding plate 34 extends between the two longitudinal portions 24 of filter frame 22 in a cross-sectional region 26 of the frame. Further, holding plate 34 is pivotally connected to the rear edge of said cross-sectional region 26 of the frame when viewed in flow direction 28 and extends transversely to flow direction 28. The filter element 10 is placed onto this holding plate 34, projecting into filter frame 22, with the outer filter element folding portion 12 as shown in FIG. 2. By pulling off box 32, filter element 10 is gradually inserted into filter frame 22. Also the second cross-sectional region 26 has a holding plate 34 arranged thereon, being of the same shape and orientation as the above described holding plate. Filter element 10 is placed onto this second holding plate 34 with its other outward filter element folding portion 12 and thereafter will maintain the position illustrated in FIG. 3 within the filter frame 22. In this position, filter element 10 is not yet completely stretched, this stretching will be performed by pivoting the two holding plates 34 towards the respective cross-sectional region 26 of the frame. By a respective locking means, at the upper end of the cross-sectional regions 26, the holding plates 34 can be kept in their locked positions parallel to the cross-sectional regions 26 of the frame. Each of said locking means comprises a pivoting bar 36 pivoted to the upper end of the appertaining cross-sectional region 26 of the frame and having a V-shaped bar 38 connected thereto. Said V-shaped bar 38 is open towards the side facing away from the pivoting bar 36.

By pivoting movement of pivoting bar 36 towards the inside of filter frame 24, the V-shaped bar 38 will have its opening directed towards the flange 30 of the frame (cf. FIG. 4). After previously pressing the holding plate 34 against the appertaining cross-sectional region 26 of the frame, the V-shaped bar 38 engages from above the first bending line 14 of filter element 10 following an outer filter element folding portion 12 and prevents return movement of holding plate 34. By hooked members 40, projecting laterally over the longitudinal portions 24 of the frame, being integral with pivoting bar 36 and provided for engaging into locking recesses 42 in the outer face of the longitudinal portions 24 of the frame, pivoting bar 36 can be locked in a suitable position for holding the holding plates 34.

With the holding plates 34 pivoted towards the appertaining cross-sectional regions 26 of the frame, the outer filter element folding portions 12 extend along the inner sides of the cross-sectional regions 26 between these and the holding plates 34. By the resultant stretching of filter element 10, filter element 10 is tightened so that the tensioning bands 20 are subjected to tension and in this condition exert their function for stabilizing the wave-shape of filter element 10.

FIGS. 6 to 10 illustrate a second locking mechanism for holding the holding plates 34. As far as possible, parts of the filter means corresponding to those of the filter means of FIGS. 2 to 5 are designated by identical reference numerals in FIGS. 6 to 10. By means of film hinges 44, each of the holding plates 34 is connected to a respective cross-sectional region 26 of the frame. The lower end of the cross-sectional region 26 of the frame has an angular bendable bar 48 pivoted thereto by means of a respective film hinge 46. This angular bar 48 comprises a first bar portion 50 connected to the cross-sectional region 26 of the frame and having a height substantially identical to the height of filter frame 22. Said first bar portion 50 is joined by a second bar portion 52 extending at a right angle to the first bar portion 50. The two second bar portions 52 of the angular bars 48 on the two cross-sectional regions 26 of the frame face each other. The end of the second bar portion 52 has a hooked end 54 integrally attached thereto.

As can be seen from FIG. 7, the holding plate 34 and the outer filter element folding portion 12 are first brought into an orientation parallel to the cross-sectional region 26 of the frame by pressing onto filter element 10 in the direction of arrow 56 of FIG. 7. At the same time, the angular bar 48, while bending its two bar portions 50,52, is drawn over the upper end of the cross-sectional region 26 of the frame until the second bar portion 52 with its hooked end 54 engages from above the first bending line 14 of filter element 10 securing the outer filter element folding portion 12. By the bending of the two bar portions 50,52 of angular bar 48, the latter is mechanically biased. Since angular bar 48 is made from an elastically deformable material, the two portions 50,52 will be oriented in linear fashion. Thereby, the angular bar 48 remains automatically in the position according to FIG. 9 for holding the appertaining holding plate 34. To facilitate the pressing of the end portion of filter element 10 against the cross-sectional regions 26 of the frame, the second bar portion of angular bar 48 has a recess 56 formed therein as shown in FIG. 10. Due to this recess 56, it is possible to press the first bar portion 50 from outside the filter frame against the cross-sectional region 26 of the frame and simultaneously press the filter element 10 from inside the filter frame against the cross-sectional region 26. This facilitates the locking of holding plates 34 in their position for tensioning and holding the filter element 10 in filter frame 22.

Figure 12:
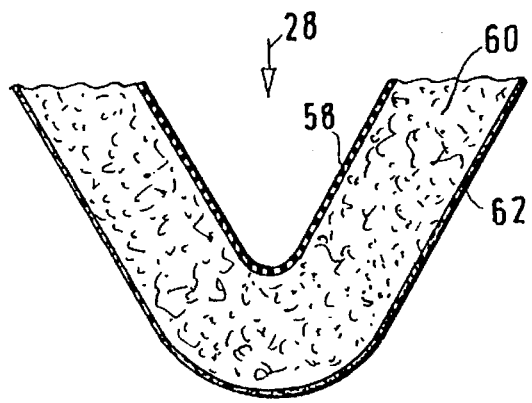
FIG. 12 is an enlarged cross-sectional view of the filter element in a downstream bending line.
Figure 13:
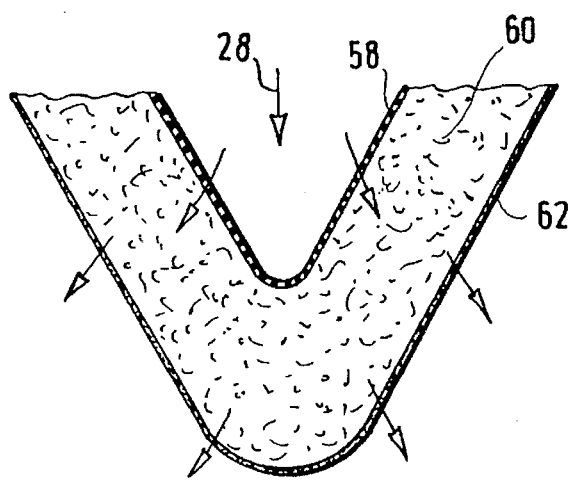
FIG. 13 is a view similar to FIG. 12 of the filter element with fluid passing therethrough, for illustrating the expansion of the non-woven filter material layer.
Figure 11:
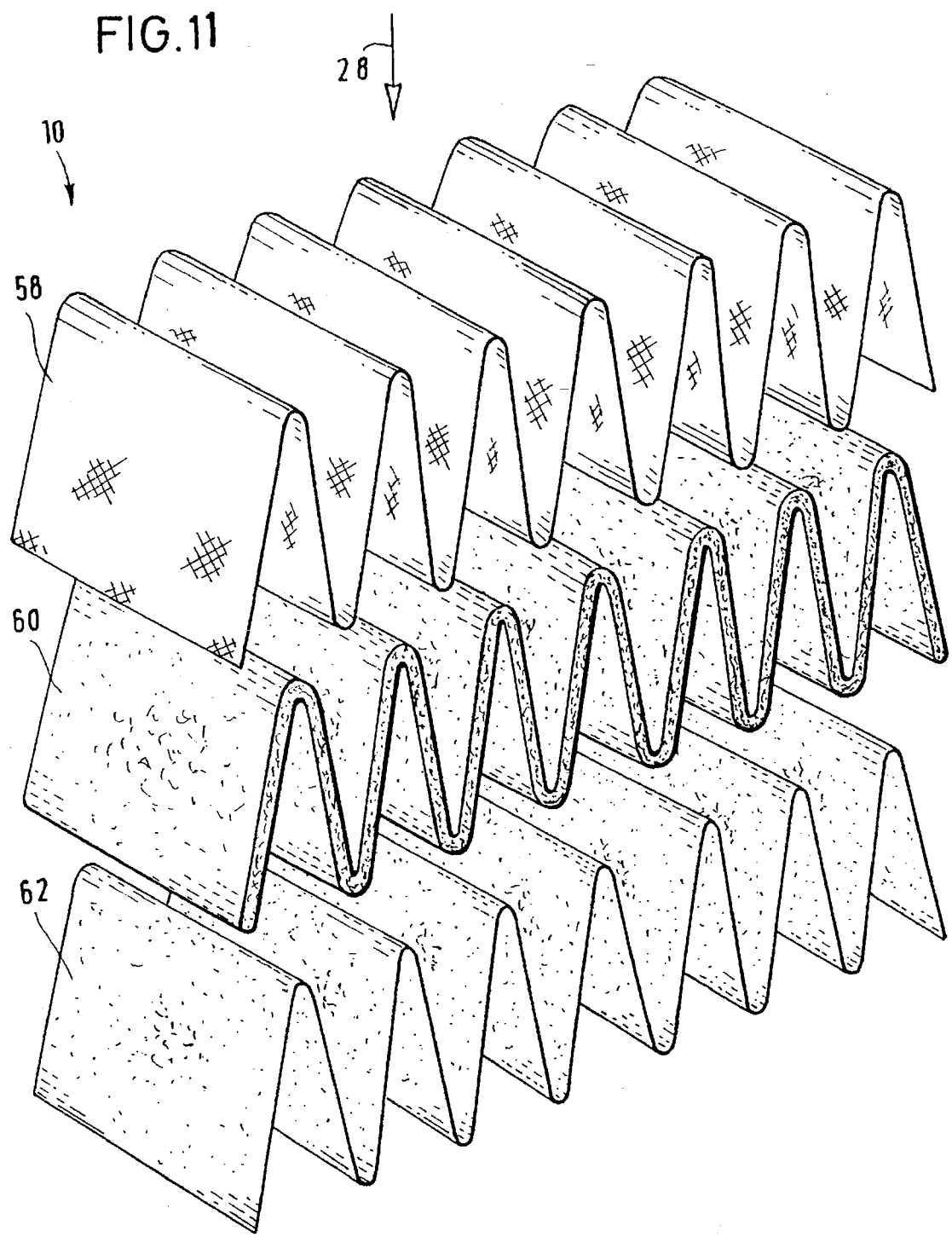
FIG. 11 is an exploded view of the arrangement of the filter element of FIG. 1 with the tensioning members omitted.

The arrangement of a preferred filter element 10 will be explained hereunder with reference to FIG. 11. Filter element 10 comprises a reticular support structure 58 of polypropylene, a loose layer 60 of non-woven material and a strengthened layer 62 of non-woven material. The layers 60,62 consist of polypropylene fibers. Both layers 60,62 and the support structure are attached to the tensioning bands 20. The non-woven material layer 60 is the actual filtering layer and is glued to the reticular support structure 58. The surface of the non-woven material layer 60 facing away from the reticular support structure 58 has the cover layer 62 of strengthened nonwoven material arranged thereon. The strengthened nonwoven material 62 is glued to the loose non-woven material 60 for holding it together. Thus, as shown in FIG. 1, the reticular support structure 58, the nonwoven material layer 60 (filter material layer) and the cover layer 62 of strengthened non-woven material are arranged one after the other in this order when seen in flow direction 28. FIG. 12 is an enlarged view of filter element 10 at one of its bending lines 14 with flat filter element folding portions 12 joining it. It is an advantage of the structure of the filter element described with reference to FIG. 11 that the non-woven material layer 60 will expand when fluid is flowing through filter element 10, the expanded condition shown in FIG. 13. By this expansion, the volume of the nonwoven material layer 60 and thus the storage volume of filter element 10 are increased. At the same time, cover layer 62 prevents detachment of non-woven material from the filter material layer.

By providing a comparatively smooth surface, formed by the reticular support structure 58, at the entrance side of filter element 10, turbulences are lowered in the V-shaped intermediate spaces of the filter element folding portions 12 oriented in a zig-zag-shape, and can be at a smaller angular relation than when the non-woven material layer 60 is arranged before the reticular support structure 58 when viewed in the flow direction. Thus, it is possible to increase the number of filter element folding portions 12 for a given length of the filter element 10, i.e., to arrange the filter element folding portions 12 at steeper angles. The result is that the filter surface area is enlarged and thus the filtering characteristics are improved.

Figure 5:
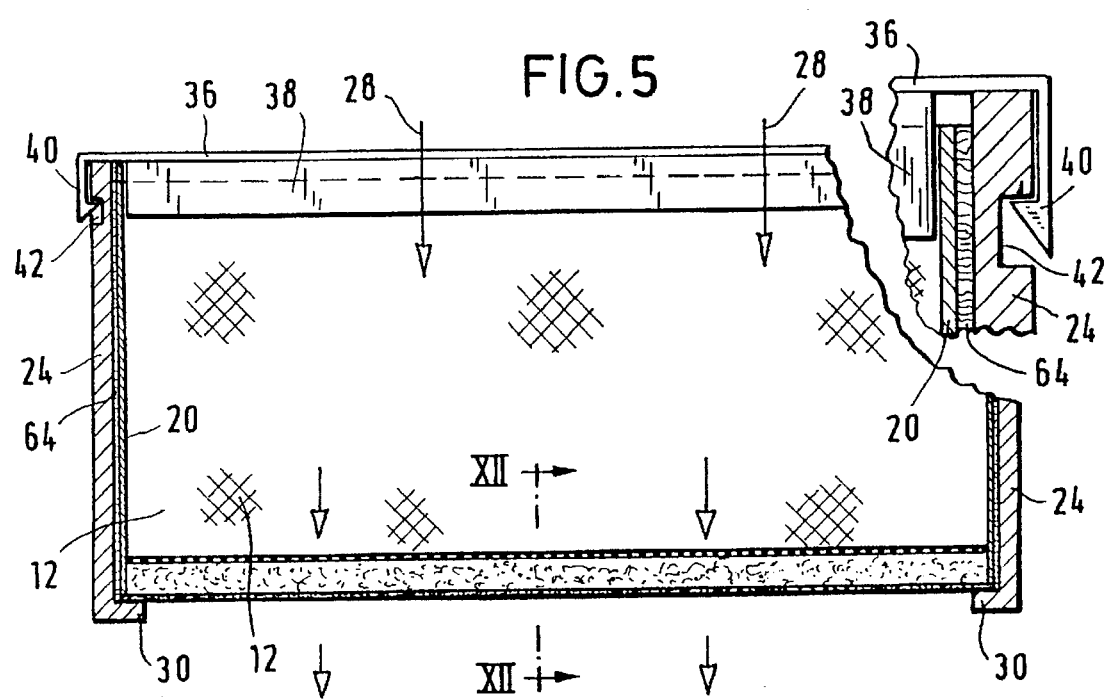
FIG. 5 is a sectional view along the line V—V of FIG. 4.

Finally, another feature of the above described filter system will be mentioned with reference to FIG. 5. Tensioning bands 20 consist of a strengthened nonwoven material, i.e., have fiber ends 64 protruding laterally therefrom. These fiber ends 64 are illustrated in the enlarged portion of FIG. 5. In the stretched condition of filter element 10, the tensioning bands 20 are tightly tensioned. The width of filter element 10 is selected such that the outer faces of tensioning bands 20, with individual fiber ends projecting from the outer faces, lie on the inner faces of the longitudinal portions 24 of the frame. "Fluttering" of tensioning bands 20 during (air) flow through filter element 10 is precluded first by the tension of tensioning bands 20 and second by the reticular support structure 58 of filter element 10. The intermediate spaces between the tensioning bands 20 and the longitudinal portions 24 of the frame are filled with non-woven material so that the air streaming through these intermediate spaces will be filtered. The intermediate spaces between the two outermost folding portions 12 of filter element 10 and the transverse portions 26 of the frame are closed downstream by the holding plates 34 hinges which are pivotally connected to the filter frame 22 and extend over the entire length of the holding plates 34.

EXAMPLE

It is especially advantageous if the filter element as described above and shown in the Figures is arranged in the manner described hereunder and consists of the parts and materials indicated hereunder. As a material for the webs of the reticular support structure 58, there are selected fibers having a diameter of about 0.45 mm. The openings of the reticular support structure 58 are diamond-shaped and have a size of about 3.6×4.1 mm. The thickness (height) of the reticular support structure is about 0.85 mm. The fibers consist of polypropylene or other polymers. The non-woven material of the electret filter layer 60 consist of split fibers 10 by 40 microns in diameter. The basis weight of the non-woven material is about 85 g/m². The fiber material comprises needle tacked fibers randomly arranged. The thus-treated fiber material layer has a thickness of 2.0 mm. The fibers comprise polypropylene with electret characteristics provided by the known methods in the art. Connection between the electret filter layer 60 and the reticular support structure 58 is performed by gluing by an adhesive compatible with polypropylene. As materials for the electret filter layer, there can be used the products distributed under the designation 3M Filtrete™ or 3M SBMF by the Minnesota Mining and Manufacturing Company. Alternative to the above-mentioned non-woven material would consist in a non-woven material obtained in a melt-blown process, or in circular fibers of a 1–5 micron diameter.

The cover layer 62 comprises a non-woven spun-bonded material produced in a known manner from fibers being multiply thermally bonded and randomly arranged. The basis weight of this non-woven spun-bonded material is 30 g/m². Connection between the cover layer 62 and the electret filter layer 60 is effected by known adhesives. As materials for the fibers of cover layer 62, polyester, polyamide and preferably polypropylene are suitable. The thickness of the cover layer is preferably 0.22 mm.

The tensioning bands 20 comprise the same material as the cover layer and are produced in the same manner as these.

With such reticular support structures, electret filter layers and cover layers, there can be made filter elements, arranged in zig-zag folds, which, with an overall size of 100×300 mm, have a folding portion length of 25 mm and a folding, i.e., a distance from one bending line to another, of about 0.8–1.5 cm, preferably 1.0 cm. Thus, a V-shaped recess or projection area of the filter element is preferably 1.0 cm wide at the wider portion thereof facing away from the tip, with the length of the legs or the depth (height) being about 25 mm. The filter frame 22 has inner dimensions which substantially correspond to the outer dimensions of filter element 10.

A filter element of the above type can be used to filter 300 m³/h of air. The pressure drop will be in the range of 120 Pa. The novel construction of filter element 10 allows reduction of this pressure drop by up to about 10–20% with simultaneous enlargement of the filter surface and the filter material quantity. The resulting main advantage is to be seen in the lengthened life span of the filter element of the invention.

We claim:

1. An air filter system for filtering air streaming into the passenger cabin of a vehicle, comprising a filter element (10) folded in a wave-shaped or zig-zag-shaped manner having bending lines (14) and substantially plane filter element folding portions (12) arranged therebetween, the wave-shaped filter element (10) formed by a wave-shaped reticular non-filtering support structure (58) having connected thereto a wave-shaped air filter layer (60) of a non-woven material, the air filter layer (60) being arranged behind the reticular support structure (58) when viewed in the flow direction where both the wave-shaped filter layer and the wave-shaped reticular support are formed of thermoplastic material and together define the shape of the wave-shaped filter element, and that the non-woven material of the filter layer (60) is freely expandable to the side facing away from the reticular support structure (58).

2. The filter system according to claim 1, wherein the wave-shaped filter layer (60) on the side thereof facing away from the wave-shaped reticular support structure (58) is connected to a cover layer (62) to keep the non-woven material (60) together.

3. The filter system according to claim 2, wherein said cover layer (62) consists of a strengthened non-woven material.

4. The filter system according to claim 2, wherein the wave-shaped reticular support structure (58) and the non-woven material of the wave-shaped filter layer (60) and the cover layer (62) consist of polypropylene.

5. The filter system according to claim 1 wherein the wave-shaped filter layer (60) is an electret filter layer.

* * * * *